(12) United States Patent
Allison et al.

(10) Patent No.: US 12,552,329 B2
(45) Date of Patent: Feb. 17, 2026

(54) ACOUSTIC COMPOSITE FOR AUTOMOTIVE APPLICATIONS

(71) Applicant: Auria Solutions UK I, Ltd., London (GB)

(72) Inventors: Timothy Joel Allison, Marion, NC (US); Eric Staudt, Fletcher, NC (US); Steven Kelly Edwards, Marion, NC (US)

(73) Assignee: AURIA SOLUTIONS UK I, LTD., London (GB)

( * ) Notice: Subject to any disclaimer, the term of this patent is extended or adjusted under 35 U.S.C. 154(b) by 288 days.

(21) Appl. No.: 18/311,299

(22) Filed: May 3, 2023

(65) Prior Publication Data

US 2023/0356672 A1    Nov. 9, 2023

Related U.S. Application Data

(60) Provisional application No. 63/337,767, filed on May 3, 2022.

(51) Int. Cl.
*B60R 13/08* (2006.01)
*B32B 5/02* (2006.01)
(Continued)

(52) U.S. Cl.
CPC .......... *B60R 13/0815* (2013.01); *B32B 5/022* (2013.01); *B32B 7/022* (2019.01); *B32B 7/12* (2013.01); *B32B 27/12* (2013.01); *B32B 37/144* (2013.01); *B32B 2250/03* (2013.01); *B32B 2250/04* (2013.01); *B32B 2305/20* (2013.01);
(Continued)

(58) Field of Classification Search
CPC ..... B60R 13/0815; B32B 7/022; B32B 7/027; B32B 7/12; B32B 5/266; B32B 5/022; B32B 2307/7376; B32B 27/12; B32B 27/144; B32B 2250/03; B32B 2250/04; B32B 2260/023; B32B 2260/046; B32B 2305/20; B32B 2307/102;
(Continued)

(56) References Cited

U.S. PATENT DOCUMENTS 11,186,236 B2   11/2021  Shida et al.
2003/0041952 A1  3/2003  Mortellite et al.
(Continued)

FOREIGN PATENT DOCUMENTS

JP    5006681 B2      8/2012
JP    2013007138 A    1/2013
KR    20140124103 A   10/2014

OTHER PUBLICATIONS

International Search Report and Written Opinion of International Application No. PCT/US23/20780, mail date Sep. 20, 2023, 12 pages.

*Primary Examiner* — Camie S Thompson
(74) *Attorney, Agent, or Firm* — Grossman, Tucker, Perreault & Pfleger, PLLC; Steven J. Grossman

(57) ABSTRACT

The present invention relates to an acoustic composite of non-woven materials, infused with polymeric film material, for automotive applications, and a corresponding method of formation that provides for a relatively broad range of airflow resistance and acoustic performance. Such airflow resistance and/or acoustic performance can be conveniently adjusted by material selection and method of production.

5 Claims, 2 Drawing Sheets

(51) Int. Cl.
    *B32B 7/022*     (2019.01)
    *B32B 7/12*     (2006.01)
    *B32B 27/12*     (2006.01)
    *B32B 37/14*     (2006.01)
    *G10K 11/168*     (2006.01)

(52) U.S. Cl.
    CPC ... *B32B 2307/102* (2013.01); *B32B 2307/718* (2013.01); *B32B 2307/724* (2013.01); *B32B 2307/7376* (2023.05); *B32B 2605/00* (2013.01); *G10K 11/168* (2013.01)

(58) Field of Classification Search
    CPC ........ B32B 2307/718; B32B 2307/724; B32B 2605/00; B32B 2605/08; G10K 11/168
    See application file for complete search history.

(56) References Cited

U.S. PATENT DOCUMENTS

2017/0372688 A1    12/2017    Bush et al.
2021/0070023 A1*    3/2021    Whitesell, Jr. .......... B32B 27/34

* cited by examiner

ACOUSTIC COMPOSITE FOR AUTOMOTIVE APPLICATIONS

CROSS REFERENCE TO RELATED APPLICATIONS

This application claims benefit of U.S. Provisional Application 63/337,767 filed May 3, 2022, the teachings of which are incorporated herein by reference.

FIELD

The present invention relates to an acoustic composite of non-woven materials, infused with polymeric film material, for automotive applications, and a corresponding method of formation that provides for a relatively broad range of airflow resistance and acoustic performance. Such airflow resistance and/or acoustic performance can be conveniently adjusted by material selection and method of production.

BACKGROUND

The regulation and optimization of airflow resistance and acoustic performance, within the interior of an automobile, remains an on-going area of development. More specifically, there remains an on-going need to suppress noises generated outside the vehicle from reaching the vehicle interior. Towards this objective, there have been a variety of efforts to develop multiple layer laminates, sourced from nonwoven type materials, to resolve such issues.

SUMMARY

A method for forming an acoustic composite comprising: providing a layered precursor structure having an upper nonwoven layer having a thickness of 1.0 mil to 200.0 mils at a basis weight of 10 $g/m^2$ to 200 $g/m^2$, a polymer film layer at a thickness of 0.1 mil to 40.0 mils at a basis weight of 10 $g/m^2$ to 90 $g/m^2$ and a lower nonwoven absorber layer having a thickness of 75.0 mils to 4000.0 mils at a basis weight of 100 $g/m^2$ to 3000 $g/m^2$. One may then apply heat and pressure to said layered precursor structure and form said acoustic composite where said acoustic composite indicates an airflow resistance in units of Rayls (MKS) in the range of 800-10,000.

A layered precursor structure suitable for formation of an acoustic composite for automotive applications comprising: an upper nonwoven layer having a thickness of 1.0 mil to 200.0 mils at a basis weight of 10 $g/m^2$ to 200 $g/m^2$, a polymer film layer at a thickness of 0.1 mil to 10.0 mils at a basis weight of 10 $g/m^2$ to 90 $g/m^2$; and a lower nonwoven fiber absorber layer having a thickness of 75.0 mils to 4000.0 mils at a basis weight of 100 $g/m^2$ to 3000 $g/m^2$.

A method for forming an acoustic composite comprising: providing a layered precursor structure having an upper nonwoven layer having a thickness in the range of 55.0 mils to 800.0 mils at a basis weight of 400 $g/m^2$ to 2000 $g/m^2$; a polymer film layer at a thickness of 0.1 mil to 40.0 mils at a basis weight of 10 $g/m^2$ to 90 $g/m^2$; an intermediate nonwoven layer having a thickness of 1.0 mil to 200.0 mils at a basis weight of 10 $g/m^2$ to 200 $g/m^2$; and a lower nonwoven fiber absorber layer having a thickness of 75.0 mils to 4000.0 mils at a basis weight of 100 $g/m^2$ to 3000 $g/m^2$; and applying heat and pressure to said layered precursor structure and forming said acoustic composite where said acoustic composite indicates an airflow resistance in units of Rayls (MKS) in the range of 800-10,000.

A method for forming an acoustic composite comprising providing a three-layered precursor having an upper nonwoven layer having a thickness in the range of 55.0 mils to 800.0 mils at a basis weight of 400 $g/m^2$ to 2000 $g/m^2$; a polymer film layer at a thickness of 0.1 mil to 40.0 mils at a basis weight of 10 $g/m^2$ to 90 $g/m^2$; and an intermediate nonwoven layer having a thickness of 1.0 mil to 200.0 mils at a basis weight of 10 $g/m^2$ to 200 $g/m^2$ and applying heat and pressure to said three-layered structure and forming a three-layered composite. This is then followed by providing a lower nonwoven fiber absorber layer having a thickness of 75.0 mils to 4000.0 mils at a basis weight of 100 $g/m^2$ to 3000 $g/m^2$ and attaching said lower nonwoven fiber absorber layer to said intermediate layer of said three-layer composite and forming said acoustic composite where said acoustic composite indicates an airflow resistance in units of Rayls (MKS) in the range of 800-10,000

A layered precursor structure suitable for formation of an acoustic composite for automotive applications comprising: an upper nonwoven layer having a thickness in the range of 55.0 mils to 800.0 mils at a basis weight of 400 $g/m^2$ to 2000 $g/m^2$; a polymer film layer at a thickness of 0.1 mil to 40.0 mils at a basis weight of 10 $g/m^2$ to 90 $g/m^2$; and an intermediate nonwoven layer having a thickness of 1.0 mil to 200.0 mils at a basis weight of 10 $g/m^2$ to 200 $g/m^2$.

DETAILED DESCRIPTION OF PREFERRED EMBODIMENTS

The present invention is directed at an acoustic composite of nonwoven material that is selectively infused with molten polymeric film material. The reference to an acoustic composite may therefore be understood as a nonwoven material having all or a portion of the nonwoven infused with the molten polymeric film material. The polymeric film material is preferably infused into the nonwoven material by application of only heat and pressure, as further described herein.

The infused nonwoven material so formed is one that now provides a selected air flow resistance and acoustic performance. More specifically, the infused nonwoven material is such that the fibers of the nonwoven are coated with the polymer film and the composite so produced retains openings and porosity through and within the nonwoven fibers making it suitable to provide a composite with a desired degree of air flow resistance and acoustic performance for automotive acoustic applications.

Figure 1:
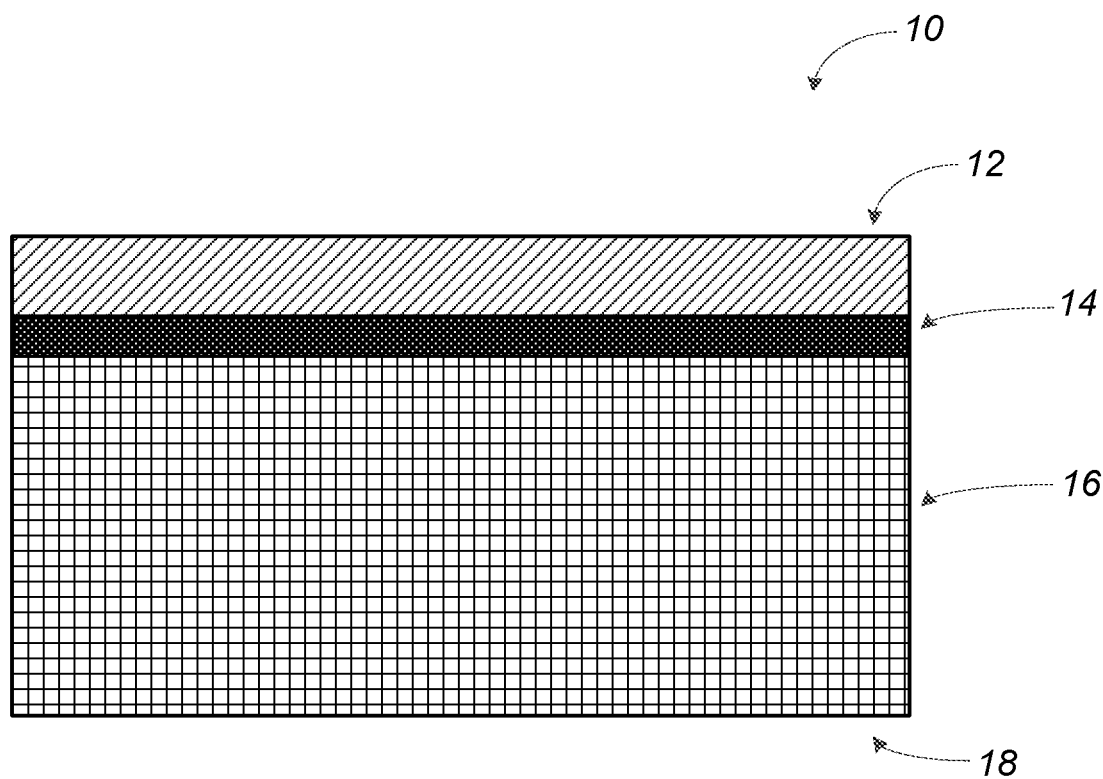
FIG. 1 illustrates a first example of a precursor layered structure of a non-woven material/polymer film combination that is then heated and pressed into the composite herein for an automotive application.

FIG. 1 illustrates a first example of a precursor layered structure of a non-woven material/polymer film combination 10 that is then heated and pressed into the composite herein for an automotive application. As illustrated, one preferably begins with an upper nonwoven layer 12, polymer film layer 14, and lower nonwoven absorber layer 16. The upper nonwoven layer 12 preferably has a thickness of 1.0 mil to 200.0 mils, including all values and increments therein. For example, 1.0 mil to 100.0 mils, or 1.0 mil to 50.0 mils or 1.0 mil to 25.0 mils or 1.0 mil to 15.0 mils. A mil herein is reference to 0.001 inches. The upper nonwoven layer also preferably has a basis weight in the range of 10 g/m² to 200 g/m², including all individual values and increments therein. For example, one particular preferred range is 10 g/m² to 60 g/m² or 10 g/m²-25 g/m².

The upper nonwoven layer 12 may be preferably selected from polymer material in fiber form such as aromatic polyesters such as poly(ethylene terephthalate) or PET, polyamides, cotton, cellulose, polyacrylics, polyacrylonitrile, aromatic polyamides, and/or olefin fibers. One may also utilize recycled or regrind type polymers to produce such nonwoven fibers. In addition, the fibers in nonwoven layer 12 may preferably include monocomponent fibers or bicomponent fibers. The nonwoven materials in layer 12 may also preferably be needled fibers, air laid fibers, spunbond fibers, spunblace fibers, wet laid fibers, and/or carded fibers.

Polymer film layer 14 is preferably present at a thickness of 0.1 mil to 40.0 mil, including all values and increments therein. For example, 0.1 mil to 20.0 mils, or 0.1 mil to 10.0 mils, or 0.1 mil to 5.0 mil, or 0.1 mil to 2.0 mil. In addition, the basis weight of the polymer film material may preferably fall in the range of 10 g/m² to 90 g/m², including all values and increments therein, such as 10 g/m²-50 g/m², or 10 g/m²-25 g/m². The polymer film layer is preferably selected from thermoplastic polymer material, which is reference to polymer resin that can be repeatedly heated and caused to flow. Such thermoplastic polymer material preferably includes polyethylene, polypropylene, polyester, polyamide, poly(vinyl chloride), cellulose acetate, polyethylene-vinyl acetate copolymers, acrylic polymer, and polyurethanes. More preferably, in the case of polyethylene, the polymer film is preferably selected from low density polyethylene (LDPE), linear low density polyethylene (LLDPE), high density polyethylene (HDPE), or even polyethylene film prepared from metallocene type catalysts (m-PE). It may also include copolymers of ethylene with acrylic acid (EAA resins). The polymer film so selected also preferably has a melt flow index (MFI) in the range of 0.5 g/10 min to 5.0 g/10 min, including all values and increments therein, according to ISO1133 (2011).

The polymer film is also one that itself may have perforations or it may also be a closed film, in the sense that there are no perforations. In addition, the film layer may itself be a multilayer polymer film material, such as a three-layer polymer film, where the upper polymer film and lower polymer film layers have a relatively lower melting point than the polymer film in the central layer.

The nonwoven absorber layer 16 is preferably present at a thickness in the range of 75.0 mils to 4000.0 mils, including all individual values and increments therein, at a basis weight in the range of 100 g/m² to 3000 g/m², including all individual values and increments therein. The polymer materials for the fiber absorber layer 16 are preferably selected from aromatic polyesters such as poly(ethylene terephthalate) or PET, polyamides, cotton, cellulose, polyacrylics, polyacrylonitrile, aromatic polyamides, and/or olefin fibers. In addition, the fibers in nonwoven fiber absorber layer 16 may include monocomponent fibers or bicomponent fibers. The nonwoven materials in layer 16 may also be needled fibers, air laid fibers, spunbond fibers, spunblace fibers, wet laid fibers, and/or carded fibers.

In addition, it is worth noting that preferably, the melting points of the polymers utilized for the nonwoven layer 12 and nonwoven layer 16 are such that they are higher than the melting point for the film layer 14. For example, the polymers utilized form the nonwoven layer 12 and nonwoven layer 16 may be non-melting type polymers (e.g. aromatic polyamides) and/or fall in the range of 80° C. to 300° C. A particular preferred melting range is 180° C. to 265° C. In a particularly preferred embodiment, the polymers for nonwoven layers 12 and 16 have a melting point that is at least 10° C. to 20° C. higher than the melting point of the polymer film layer 14.

The above-described non-woven material/polymer film precursor combination 10 is then subjected to heat and pressure, wherein the polymer film layer is melted and flows into both the upper nonwoven layer 12 and the lower nonwoven fiber absorber layer 16, which nonwoven layers preferably do not melt. The pressure utilized may preferably fall in the range of 0.5 psi to 150 psi, including all values and increments therein. For example, the pressure may fall in the range of 0.5 psi to 100 psi, or 0.5 psi to 100.0 psi, or 0.5 psi to 90.0 psi, or 0.5 psi to 80 psi. The temperature of the tooling surface that is in contact with, e.g., the nonwoven layer 12 (FIG. 1) may preferably be in the range of 275° F. to 400° F. The tooling may include, e.g., a roller having the aforementioned surface temperature and be able to provide the aforementioned pressure requirements to the nonwoven material/polymer film combination.

In so doing, the polymer resin from the film layer 14 is melted and infused into all or a portion of the nonwoven fibers present in upper nonwoven layer 12 and/or nonwoven fiber absorber layer 16. The product so obtained then provides for the ability to provide a selected and tunable airflow resistance and acoustic performance in the final product. Such may be characterized in units of Rayls (MKS) that can preferably fall in the range of 800 to 10,000 Rayls (MKS), including all values and increments therein. More preferably, the Rayl value is in the range of 3000 to 9000 Rayls (MKS).

Accordingly, one can now provide for an acoustic layer for an automobile application that can be tuned to provide selected and targeted acoustic properties, by selection of nonwoven material and polymer film material, which is then heated and pressed in a mold, to obtain such targeted performance. In such regard, the lower surface 18 of the non-woven material/polymer film combination 10 can then be affixed to the inside surface of the vehicle sheet metal.

Figure 2:
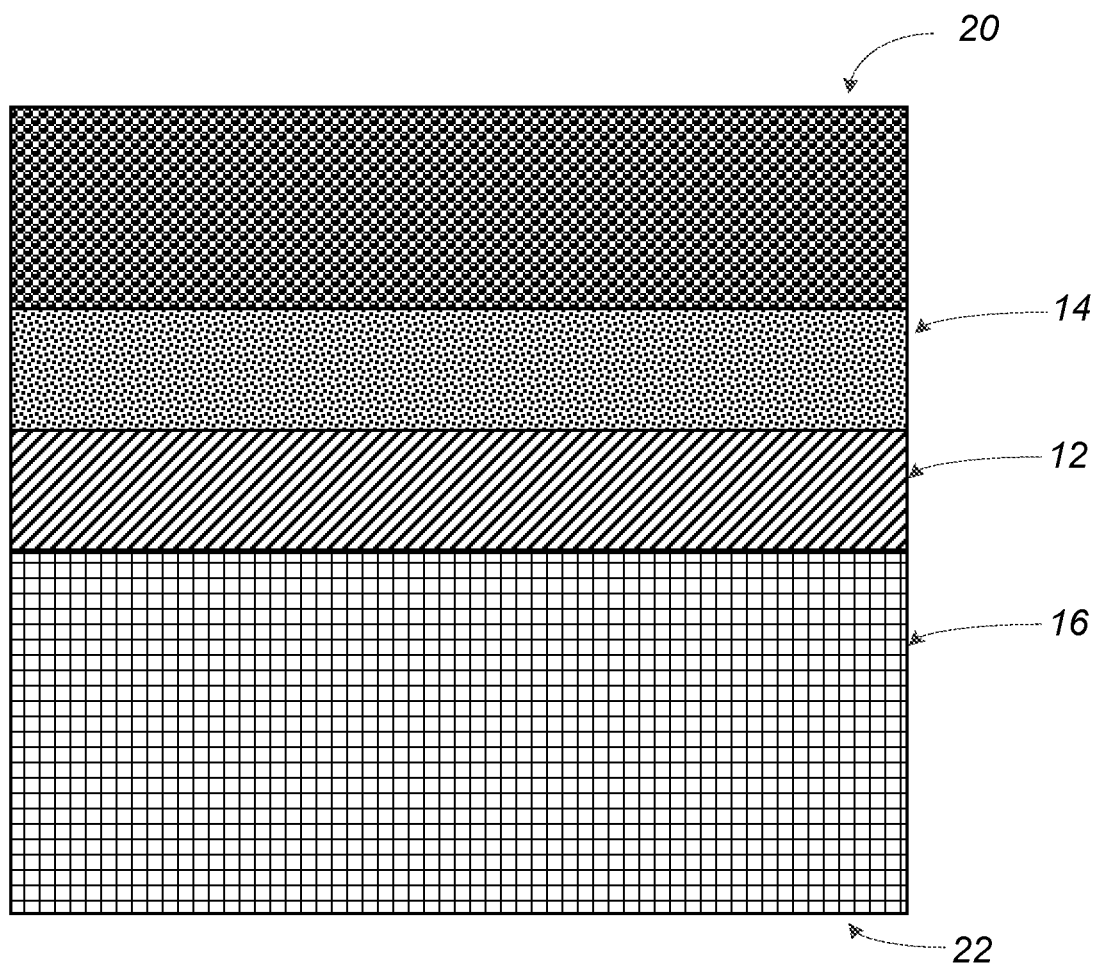
FIG. 2 illustrates a second example of a precursor nonwoven material/polymer film combination that is then heated and pressed into the composite herein for an automotive application.

FIG. 2 illustrates a second example of the non-woven material/polymer film precursor combination that is then heated and pressed into the composite herein for an automotive application. In this example, one employs what can be described as a relatively dense nonwoven upper fiber layer 20. Such fiber layer 20 is characterized as preferably having a thickness in the range of 55.0 mils to 800.0 mils, including all individual values and ranges therein. For example, fiber layer 20 may have a thickness in the range of 115.0 mils to 400.0 mils. In addition, fiber layer 20 preferably has a basis weight in the range of 400 g/m² to 2000 g/m² including all individual values and increments therein. For example, fiber layer 20 may have a basis weight in the range of 800 g/m² to 1500 g/m².

The polymer film layer 14 in FIG. 2 is then preferably as described above for FIG. 1. Similarly, the nonwoven layer 12 in FIG. 2 is then preferably as described above for FIG. 1, but is now located in what can be described as an intermediate nonwoven layer, as it is positioned below the polymer film layer 14. In addition, a lower nonwoven fiber absorber layer 16 in FIG. 2 is then preferably as described above for FIG. 1.

Accordingly, similar to the situation in FIG. 1, and now with reference to FIG. 2, the melting points of the polymers utilized for the relatively dense upper nonwoven fiber layer 20 and nonwoven layer 12 are such that they are higher than the melting point for the polymer film layer 14. Similarly, lower nonwoven fiber layer 16 preferably has a melting point that is higher than the melting point of the polymer film layer 14. Therefore, the polymers utilized for the nonwoven layer 20, nonwoven layer 12 and lower nonwoven fiber layer 16 may be non-melting type polymers (e.g. aromatic polyamides) and/or fall in the range of 80° C. to 300° C. A particular preferred melting range is 180° C. to 265° C. In a particularly preferred embodiment, the polymers for nonwoven layer 20, 12 and 16 illustrated in FIG. 2 all have a melting point that is at least 10° C. to 20° C. higher than the melting point of the polymer film layer 14

It should now be noted that with respect to any of the nonwoven layers described herein, such as nonwoven layers 12, 16, and/or 20 illustrated in FIGS. 1 and/or 2, the nonwoven layer thickness herein is preferably measured according to DIN EN ISO9073-2 entitled *Textiles—Test Methods for Nonwovens—Part 2: Determination of Thickness.*

The above-described nonwoven material/polymer film precursor combination in FIG. 2 is then subjected to heat and pressure in a mold, wherein the polymer film layer 14 is melted and now flows into both the upper densified nonwoven fiber layer 20 and into the lower nonwoven fiber layer 12, which nonwoven layers again, preferably do not melt. The pressure utilized may again preferably fall in the range of 0.5 psi to 150 psi, including all values and increments therein. For example, once again, the pressure may fall in the range of 0.5 psi to 100 psi, or 0.5 psi to 100.0 psi, or 0.5 psi to 90.0 psi, or 0.5 psi to 80 psi. The temperature of the tooling surface that is in contact with, e.g., the nonwoven layer 20 (FIG. 2) may preferably be in the range of 275° F. to 450° F., more preferably 370° F. to 400° F. The tooling may again include, e.g., a roller having the aforementioned surface temperatures and be able to provide the aforementioned pressure requirements to the nonwoven material/polymer film combination.

Similar to the situation in FIG. 1, the application of heat and pressure is such that the polymer resin from the film 14 is melted and now infused into all or a portion of the upper densified nonwoven fiber layer 20 and/or nonwoven layer 12. See FIG. 2.

It is now also worth noting that there are two preferred routes to formation of the acoustic composite from the precursor layers illustrated in FIG. 2. In one preferred embodiment as noted above, all of the layers illustrated can be heated and pressed to form the acoustic composite. Alternatively, one can first heat and press a three-layer precursor of nonwoven fiber layer 20, polymer film layer 14, and nonwoven fiber layer 12, at pressures in the range of 0.2 psi to 10.0 psi. Then, one can separately attach with additional heating lower nonwoven fiber layer 16. The attachment of lower nonwoven fiber layer 16 may include the addition of a binder powder coat or some hot melt adhesive to the surface of lower nonwoven fiber layer 16, followed by heating to then attach nonwoven fiber layer 16 to the previously heated and pressed nonwoven layer 20, polymer film 14 and nonwoven layer 12. The pressure here may again be preferably 0.5 psi to 80.0 psi.

The product so obtained by either route again provides for the ability to achieve a selected and tunable airflow resistance and acoustic performance in the final product. Such may be characterized in units of Rayls (MKS) that can preferably fall in the range of 800 to 10,000 Rayls, including all values and increments therein. More preferably, the Rayl value is in the range of 3000 to 900 Rayls (MKS). In such regard, the lower surface 22 of the non-woven material/polymer film combination illustrated in FIG. 2 can also be affixed to the inside surface of the vehicle sheet metal.

With regards to a representative process for producing the acoustic composite herein, an upper nonwoven layer 12 is applied to a polymer film layer 14 which polymer film layer is applied onto lower nonwoven fiber absorber layer 16. The polymer film layer is itself preferably selected from a multilayer film having upper and lower layers with melting points that are lower than the middle layer. The lay-up is then preferably passed through and pressed initially for about 1.0 seconds to 20 seconds, even more preferably for 10.0 second to 15.0 seconds, by a hot contact surface having a surface temperature in the range of 350° F. to 400° F. This preferably serves to melt the film layer and attach to the nonwoven layers above and below the polymer film layer. Then, it can be cut to size if desired, and placed into a heated platen and pressed at a pressure of 1.0 psi to 100 psi and at temperatures of 275° F. to 450° F. Finally, the composite so produced is preferably placed into a cold mold and molded into shape and cooled. Pressures for this step are also preferably 1.0 psi and 100 psi. The composite so produced indicated a Rayl value (MKS) in the range of 800 to 10,000.

It should now be appreciated that the present invention allows for the formation of an acoustic layer for automobiles that is relatively less expensive, and which provides for an adjustability in measured acoustic performance. By regulating the thickness and basis weights of the nonwoven materials and polymer film material, and the heating and pressure profiles during molding, one now has the ability to tune the final product to a desired acoustic performance level. In addition, it should be noted that be applying different pressures to the starting non-woven material/polymer film combination, within the same mold, by e.g., adjusting the mold gap, one can create different air flow characteristics across the final molded composite, and accordingly, develop different acoustic performance within the same molded composite part. It should therefore be appreciated that the composite produce herein can be formed such that it can function as an acoustic absorber or in a transmission loss application.

What is claimed is:

1. A method for forming an acoustic composite comprising:
   a. providing a layered precursor structure having an upper nonwoven layer having a thickness in the range of 55.0 mils to 800.0 mils at a basis weight of 400 g/m$^2$ to 2000 g/m$^2$; a polymer film layer at a thickness of 0.1 mil to 40.0 mils at a basis weight of 10 g/m$^2$ to 90 g/m$^2$; an intermediate nonwoven layer having a thickness of 1.0 mil to 200.0 mils at a basis weight of 10 g/m$^2$ to 200 g/m$^2$; and a lower nonwoven fiber absorber layer having a thickness of 75.0 mils to 4000.0 mils at a basis weight of 100 g/m$^2$ to 3000 g/m$^2$; and
   b. applying heat and pressure to said layered structure and forming said acoustic composite where said acoustic composite indicates an airflow resistance in units of Rayls (MKS) in the range of 800-10,000.

2. The method of claim 1 wherein said upper nonwoven layer, intermediate nonwoven layer and lower nonwoven layer each have melting points, and said polymer film layer has a melting point, and the melting points of said upper nonwoven layer, intermediate nonwoven layer and lower nonwoven layer are each higher than the melting point of the polymer film layer.

3. The method of claim 1 wherein said polymer film layer is a multilayer material, having an upper polymer film layer, central polymer film layer, and lower polymer film layer.

4. A method for forming an acoustic composite comprising:
   a. providing a three-layered precursor having an upper nonwoven layer having a thickness in the range of 55.0 mils to 800.0 mils at a basis weight of 400 g/m$^2$ to 2000 g/m$^2$; a polymer film layer at a thickness of 0.1 mil to 40.0 mils at a basis weight of 10 g/m$^2$ to 90 g/m$^2$; and an intermediate nonwoven layer having a thickness of 1.0 mil to 200.0 mils at a basis weight of 10 g/m$^2$ to 200 g/m$^2$;
   b. applying heat and pressure to said three-layered structure and forming a three-layered composite; and
   c. providing a lower nonwoven fiber absorber layer having a thickness of 75.0 mils to 4000.0 mils at a basis weight of 100 g/m$^2$ to 3000 g/m$^2$ and attaching said lower nonwoven fiber absorber layer to said intermediate layer of said three-layer composite and forming said acoustic composite where said acoustic composite indicates an airflow resistance in units of Rayls (MKS) in the range of 800-10,000.

5. A layered precursor structure suitable for formation of an acoustic composite for automotive applications comprising:
   a. an upper nonwoven layer having a thickness in the range of 55.0 mils to 800.0 mils at a basis weight of 400 g/m$^2$ to 2000 g/m$^2$;
   b. a polymer film layer at a thickness of 0.1 mil to 40.0 mils at a basis weight of 10 g/m$^2$ to 90 g/m$^2$; and
   c. an intermediate nonwoven layer having a thickness of 1.0 mil to 200.0 mils at a basis weight of 10 g/m$^2$ to 200 g/m$^2$
      further including a lower nonwoven fiber absorber layer attached to said intermediate nonwoven layer having a thickness of 75.0 mils to 4000.0 mils at a basis weight of 100 g/m$^2$ to 3000 g/m$^2$.

* * * * *